United States Patent
Gerez et al.

(10) Patent No.: US 7,114,912 B2
(45) Date of Patent: Oct. 3, 2006

(54) FAN BLADE WITH EMBRITTLED TIP

(75) Inventors: Valerio Gerez, Yerres (FR); Edouard Jadczak, Le Mee sur Seine (FR)

(73) Assignee: Snecma Moteurs, Paris (FR)

( * ) Notice: Subject to any disclaimer, the term of this patent is extended or adjusted under 35 U.S.C. 154(b) by 107 days.

(21) Appl. No.: 10/494,367

(22) PCT Filed: Nov. 14, 2002

(86) PCT No.: PCT/FR02/03888

§ 371 (c)(1),
(2), (4) Date: May 12, 2004

(87) PCT Pub. No.: WO03/042504

PCT Pub. Date: May 22, 2003

(65) Prior Publication Data

US 2005/0106002 A1   May 19, 2005

(30) Foreign Application Priority Data

Nov. 14, 2001  (FR) .................................. 01 14690

(51) Int. Cl.
*F01D 21/00* (2006.01)

(52) U.S. Cl. ....................... 415/9; 415/170.1
(58) Field of Classification Search .............. 415/9, 415/173.4, 173.5, 174.4, 170.1; 416/2, 228, 416/236 R See application file for complete search history.

(56) References Cited

U.S. PATENT DOCUMENTS

| | | | |
|---|---|---|---|
| 1,828,409 A | 10/1931 | Densmore | |
| 3,096,930 A * | 7/1963 | Meyerhoff | 415/115 |
| 4,547,122 A * | 10/1985 | Leech | 415/9 |
| 5,417,501 A | 5/1995 | Hyde et al. | |
| 5,974,782 A | 11/1999 | Gerez | |
| 6,290,455 B1 * | 9/2001 | Hemmelgarn et al. | 415/9 |

FOREIGN PATENT DOCUMENTS

EP        1013889        6/2000

* cited by examiner

*Primary Examiner*—Edward K. Look
*Assistant Examiner*—Devin Hanan
(74) *Attorney, Agent, or Firm*—Oblon, Spivak, McClelland, Maier & Neustadt, P.C.

(57) ABSTRACT

An aircraft turbojet including a fan having a hub driven by a shaft carried by at least one bearing connected to the structure of the turbojet by a bearing support that includes an interposed decoupling device. The hub carries at its periphery a plurality of blades that move inside a retention casing with radial clearance E between the tips of the blades and an inside wall of the retention casing. The inside wall is lined in a layer of abradable material suitable for being planed away by the tips of the rotating blades. The tips of the blades are suitable for being disintegrated by the inside wall of the retention casing in the event of an impact following the appearance of unbalance that has led to the bearing being decoupled, to obtain a clearance J>E as required for operation of the decoupler.

20 Claims, 3 Drawing Sheets

FAN BLADE WITH EMBRITTLED TIP

The invention relates to a turbine engine for an aircraft, which engine is suitable for being maintained in operation in a degraded mode after the appearance of accidental unbalance on a rotor, e.g. due to a fan blade breaking under impact from a foreign body.

The invention relates more particularly to an aircraft turbojet including a fan having a hub driven by a shaft carried by at least one bearing connected to the structure of the turbojet by a bearing support that includes an interposed decoupling device, said hub carrying at its periphery a plurality of blades that move inside a retention casing with radial clearance E between the tips of said blades and the inside wall of said retention casing, said inside wall being lined in a layer of abradable material suitable for being planed away by the tips of the rotating blades.

The state of the art is illustrated by FR 2 749 883. In that document, the decoupling device is constituted by breakable links, and the radial clearance E between the tips of the blades and the inside wall of the casing is defined to be large enough to ensure that the rotor is always guided in rotation by the bearing after the breakable elements have broken and does not come into contact with the casing, at least for normal speeds of rotation of the turbine engine under flying conditions and for a pre-established degree of damage, in order to ensure that the tips of the blades do not rub against the retaining casing, since that would lead to a risk of fire and would shift the resonant mode of the rotor towards high speeds of rotation.

Because the abradable material is relatively thick, and because, for aerodynamic reasons, the inside face of the abradable material is in line with the air inlet and outlet sections of the fan, the shape of the retaining casing is relatively complex, leading to manufacturing costs and to an increase in weight and in size.

The object of the invention is to propose a turbojet as defined in the introduction in which the clearance needed for operation of the decoupler is greater than the thickness of the layer of abradable material.

The invention achieves its object by the fact that the tips of the blades are suitable for being disintegrated by the inside wall of the retention casing in the event of an impact following the appearance of unbalance that has led to the bearing being decoupled, so as to obtain clearance J>E as required for operation of the decoupler.

Advantageously, the blades present, close to their tips, respective zones of weakness that are strong enough to enable the tips of said blades to plane away the abradable material of the retention casing, and weak enough to break on the appearance of violent contact between the tips of said blades and the inside wall of the retention casing.

Thus, the clearance needed for operation of the decoupler is obtained not only by disintegration of the abradable material of the retention casing, but also and above all by disintegration of the tips of at least some of the blades of the fan.

The thickness of the abradable material can thus be greatly reduced, thereby simplifying the shape of the retention casing, reducing its weight, and reducing manufacturing costs.

It should also be observed that, because of the unbalance, the tips are caused to disintegrate mainly on those blades that are located in the region opposite from the damaged blade. As a result the unbalance is reduced following disintegration of the blade tips.

Advantageously, the zone of weakness is constituted by a groove formed parallel to the tip in one of the faces of each blade in the base material constituting said blade, said groove being filled with resin so as to provide aerodynamic continuity for said face.

The presence of this groove filled with resin also makes it possible to reduce the weight of the blade in the event of breakage.

The depth of the groove is determined in such a manner that the remaining wall is thin and strong enough to enable the abradable material to be planed while being sufficiently fragile to break in the event of the blade tip impacting against the inside wall of the retention casing.

The groove is preferably formed in the suction side face of the blade.

Preferably, the inside wall of the retention casing presents substantially axial ribs, forming a rasp, so as to facilitate disintegration of the tips of the blades in the event of unbalance and after the abradable material has been abraded away by the tips of the blades. This rasp also presents the advantage of retaining the abradable material better.

Other advantages and characteristics of the invention will appear on reading the following description given by way of example and made with reference to the accompanying drawings, in which.

Figure 1:
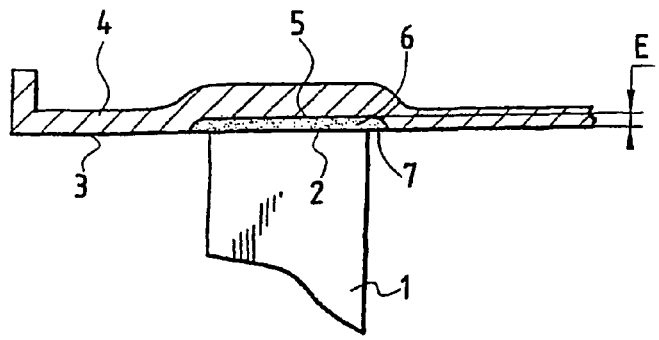
FIG. 1 is an axial half-section through the tip of a fan blade in the vicinity of the retention casing in a prior art turbojet without a decoupler.
Figure 2:
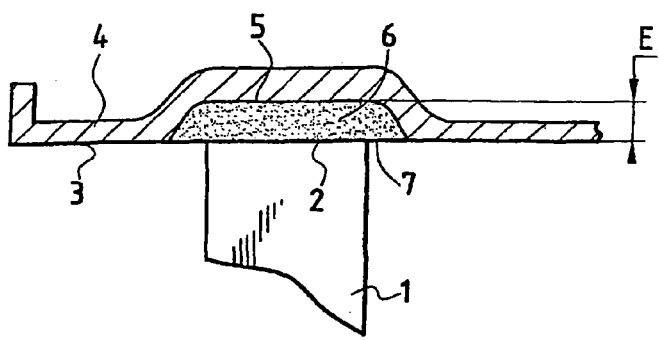
FIG. 2 is an axial half-section through the tip of a fan blade in the vicinity of the retention casing in a prior art turbojet with a decoupler.

FIGS. 1 and 2 show the radially outer portion of a fan blade 1 of a double-flow turbojet, with the tip 2 of the blade coming close to the inside wall 3 of a retention casing 4 surrounding the fan.

The annular cylindrical portion 5 of the inside wall 3 situated facing the tips 2 of the blade 1 is covered in a layer 6 of abradable material whose inside wall 7 is planed away by the tips of the blade 1 when the fan first rotates, this wall 7 nevertheless remaining approximately in line with the inside wall 3 of the retention casing 4.

Reference E designates the clearance between the tips 2 of the blades 1 and the inside wall 5 of the retention casing 4, this clearance E being occupied in normal operation of the turbojet by the layer 6 of abradable material.

The layer 6 of abradable material performs two essential roles. Firstly, during normal operation of the turbojet, i.e. in the absence of any accidental unbalance of the fan, the gap between the tips 2 of the blades 1 and the inside wall 7 of the layer 6 of abradable material, as obtained by the planing effect, is kept down to a minimum, thereby avoiding leaks through this gap and thus not degrading the efficiency of the fan.

The second role of the layer 6 is to make a degraded mode of operation possible after the appearance of an accidental unbalance, due to a blade breaking, thereby causing the axis of the rotating fan to be shifted radially through a distance D away from its original position. This displacement D leads to the tips 2 of the intact blades planing away the layer 6 of abradable material.

The thickness E of the abradable material is determined as a function of the displacement D that is calculated for a predetermined amount of damage to a blade 1, said displacement D being a function of the stiffness of the bearing supports carrying the shaft that drives the hub of the fan.

It can be seen that the clearance E shown in FIG. 1 is considerably smaller than the clearance E shown in FIG. 2. FIG. 1 applies to a conventional turbojet without a decoupler, i.e. in which the shaft bearing is always rigidly secured to the structure of the stator.

In contrast, FIG. 2 relates to a turbojet including a decoupler, i.e. the bearing support is connected to the structure via a decoupling device that includes, for example, breakable fasteners that break on the appearance of unbalance, thereby reducing the stiffness of the bearing. The geometrical axis of the fan is then shifted by a distance D from the new axis of rotation of the fan, where said distance D is greater than the corresponding distance obtained for the same reasons in a turbojet without a decoupler. That is why the radial clearance E between the tips 2 of the blades 1 and the inside wall 5 of the casing 4 is greater in the example shown in FIG. 2 than in the example shown in FIG. 1.

The invention relates to a turbojet with a decoupler.

As shown in FIGS. 3 to 7, the tips 2 of the blades 1 of the fan of a turbojet with a decoupler of the invention comes close to the inside wall 3 of the retention casing 4 surrounding the fan. The cylindrical annular portion 5 of the inside wall 3 situated in register with the tips 2 of the blades 1 is covered in a layer 6 of abradable material whose inside wall 7 is planed away by the tips 2 of the blades on first rotation of the fan, said wall 7 remaining approximately in line with the inside wall 3 of the retention casing 4.

Figure 3:
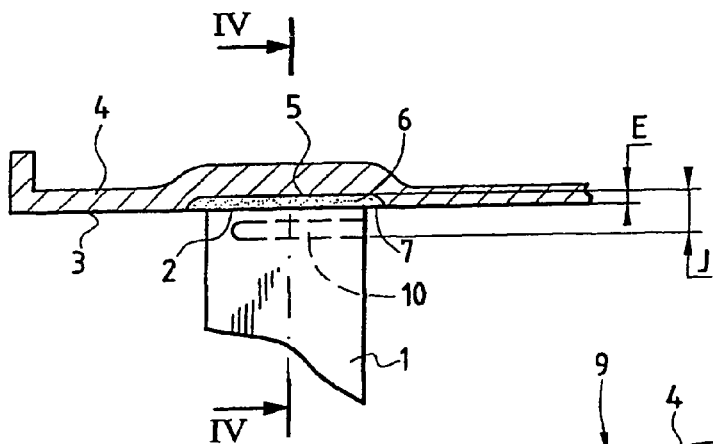
FIG. 3 shows the end of a fan blade and the adjacent portion of the retention casing in a turbojet of the invention.

As can be seen in FIG. 3, the thickness E of the abradable coating is substantially equal to the thickness shown in FIG. 1 which applies to a conventional turbojet without a decoupler, and it is insufficient to allow a decoupler to operate in the event of accidental unbalance.

In order to obtain the clearance J>E that is required for degraded operation of the turbojet in the event of accidental unbalance, the invention provides for the tips 2 of the blades 1 to be capable of being disintegrated by the inside wall 5 of the casing 4 once the layer 6 of abradable material has been planed away completely due to the appearance of accidental unbalance causing the bearing carrying the drive shaft of the hub 8 of the fan 9 to become decoupled.

Figure 5:
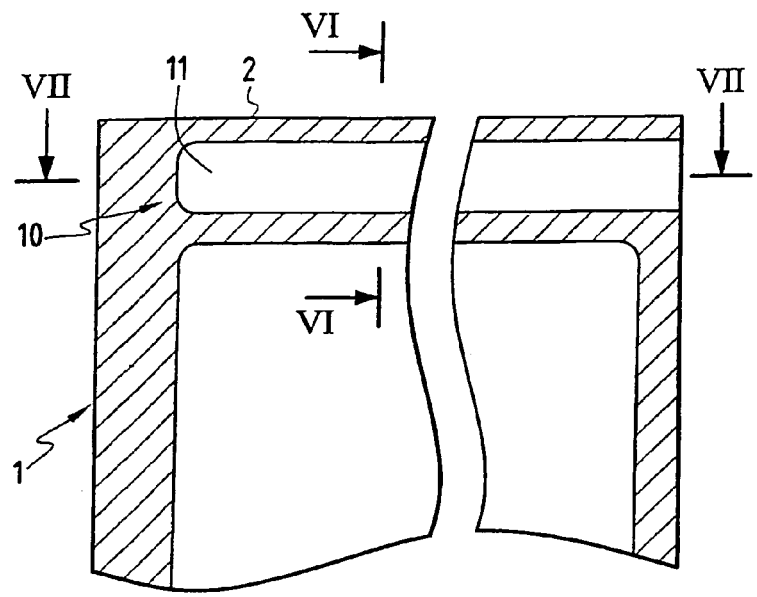
FIG. 5 is a lateral section on the suction side through the end of the blade of the invention, on line V—V of FIG. 7.
Figure 6:
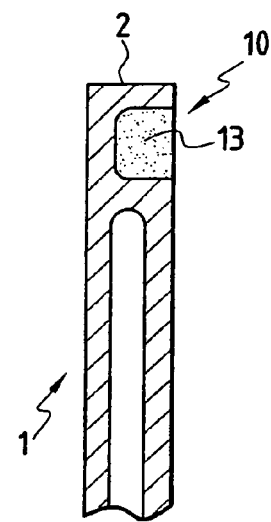
FIG. 6 is an axial section on line VI—VI of FIG. 5.
Figure 7:
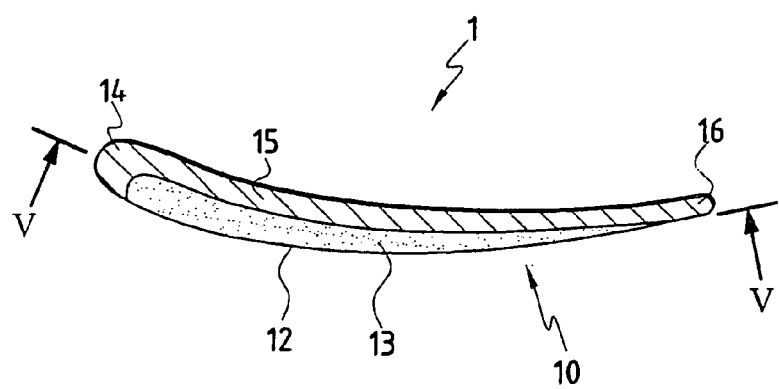
FIG. 7 is a circumferential section through the zone of weakness at the end of the blade, the section being on line VII—VII of FIG. 5.

For this purpose, and as shown in FIGS. 5 to 7, each blade 1 presents in the vicinity of its tip 2 a zone of weakness 10 that is made by means of a groove 11 extending parallel to its tip 2 in the suction side face 12 of the blade. This groove 11 is filled with resin 13 which ensures aerodynamic continuity for the suction side face 12 in the vicinity of the tip 2. The groove 11 is made in the base material of the blade 1 to a depth such that the remaining wall thickness of base material in the zone of weakness beside the leading edge 14, the pressure side face 15, and the trailing edge 16 is of sufficient strength to be capable of planing away the layer 6 of abradable material while being sufficiently weak to break in the event of an impact occurring between the tip 2 of the blade and the inside wall 5 of the retention casing 4.

Figure 4:
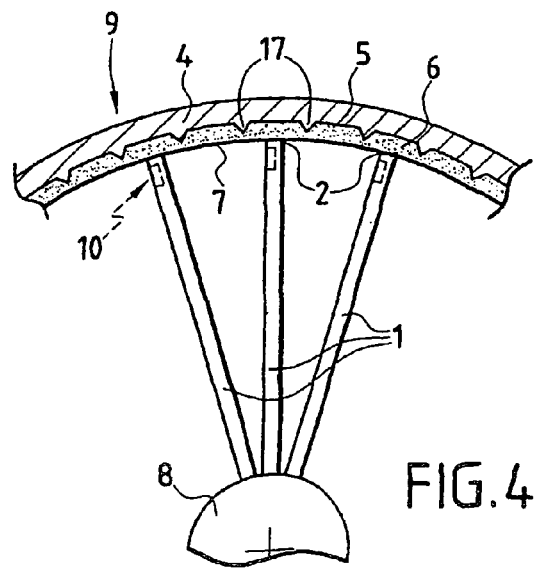
FIG. 4 is a section view on line IV—IV of FIG. 3.

As shown in FIG. 4, the inside wall 5 of the retention casing 4 presents a plurality of substantially axial ribs 17 that form a rasp, thereby making it easier to break the zones of weakness 10 in the event of unbalance once the abradable material has been completely abraded away.

In FIG. 3, the thickness of the abradable layer 6 is referenced E and the clearance obtained by disintegration of the blade tips is referenced J. The clearance E is preferably less than one-third of the clearance J.

Since, by virtue of the invention, the thickness E of the abradable material can be relatively thin, the shape of the retention casing is simplified, as are its weight and its size in register with the fan.

The resin 13 is torn away from the blade after the zone of weakness breaks, thereby enabling the weight of the blade 1 to be reduced in the event of its tip 2 disintegrating.

In operation, the disintegrated tips 2 belong to the blades 1 that are disposed on the hub 8 on the side opposite from the broken blade that gave rise to the accidental unbalance. As a result, after these tips have disintegrated, the center of gravity of the fan moves back towards its geometrical axis, thereby reducing the unbalance.

Figure 8:
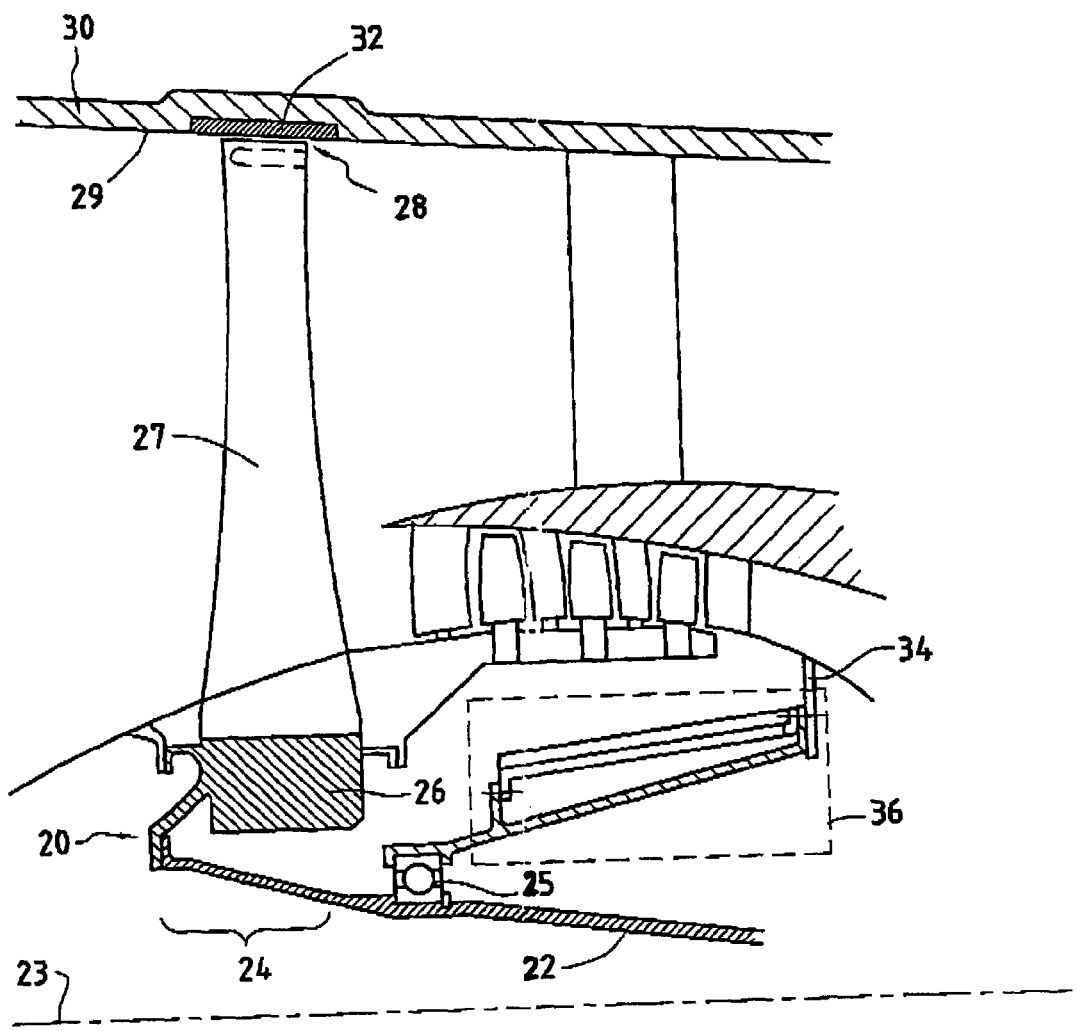
FIG. 8 shows an axial cross-section of the rotor according to an embodiment of the present invention.

FIG. 8 shows an engine comprising a rotor 20 having a shaft 22 mounted to rotate around a geometric axis of rotation 23 and a fan stage 24. The fan stage 24 comprises a ring 26 and a plurality of fan blades 27. The tips 28 of the blades 27 extend to the vicinity of the inner wall 29 of a casing 30. An abradable coating 32 is situated on the inner wall 29 in front of tips 28. The shaft 22 and hence rotor 20 is supported by a ball bearing 25 which is connected to the fixed structure 34 of the turbo engine via a bearing support including a decoupling device 36 interposed between the ball bearing and the fixed structure.

The invention claimed is:

1. An aircraft turbojet comprising:
   a fan having a hub driven by a shaft carried by at least one bearing connected to a structure of the turbojet by a bearing support that includes an interposed decoupling device, the hub carrying at its periphery a plurality of blades that move inside a retention casing with a first value of radial clearance between tips of the blades and an inside wall of the retention casing, the inside wall being lined in a layer of abradable material configured to be planed away by the tips of the blades,
   wherein the blades comprise predetermined tip portions configured to be breakable by the inside wall of the retention casing in an event of an impact following an appearance of an unbalance that has led to the bearing being decoupled, to obtain a second value of radial clearance greater than said first value of radial clearance as required for operation of the decoupler.

2. A turbojet according to claim 1, wherein the tip portions on the blades provide zones of weakness that are strong enough to plane away the abradable material of the retention casing, and weak enough to break from said unbalance.

3. A turbojet according to claim 1, wherein each blade includes a groove formed parallel to a blade tip in a face of each blade in a base material constituting the blade, the groove being filled with resin to provide aerodynamic continuity for the face.

4. A turbojet according to claim 3, wherein the groove is formed in a suction side face of the blade.

5. A turbojet according to claim 3, wherein the inside wall of the retention casing presents substantially axial ribs to facilitate breaking of the tip portions of the blades in the event of the unbalance and after the abradable material has been abraded away by the tip portions of the blades.

6. A turbojet according to claim 5, wherein the first value of radial clearance is less than one-third of the second value of radial clearance.

7. A turbojet according to claim 3, wherein the first value of radial clearance is less than one-third of the second value of radial clearance.

8. A turbojet according to claim 1, wherein the inside wall of the retention casing presents substantially axial ribs to facilitate breaking of the tip portions of the blades in the event of the unbalance and after the abradable material has been abraded away by the tip portions of the blades.

9. A turbojet according to claim 8, wherein the first value of radial clearance is less than one-third of the second value of radial clearance.

10. A turbojet according to claim 1, wherein the first value of radial clearance is less than one-third of the second value of radial clearance.

11. An aircraft turbojet comprising:
a fan having a hub carrying at its periphery a plurality of blades configured to move inside a retention casing with a first value of radial clearance between tips of the blades and an inside wall of the retention casing, the inside wall being lined in a layer of abradable material,
wherein each of the blades comprises a tip portion configured to be breakable by contact with the inside wall of the retention casing following an unbalance of the fan so as to obtain a second value of radial clearance between the tips of the blades and the inside wall of the retention casing, wherein said second value of radial clearance is greater than said first value of radial clearance.

12. A turbojet according to claim 11, wherein each of the blades includes a groove formed in a face of each of said blades.

13. A turbojet according to claim 12, wherein said groove is parallel to a tip of said each of said blades.

14. A turbojet according to claim 13, wherein the first value of radial clearance is less than one-third of the second value of radial clearance.

15. A turbojet according to claim 12, wherein said groove is filled with a resin.

16. A turbojet according to claim 15, wherein said resin provides aerodynamic continuity for said face.

17. A turbojet according to claim 11, wherein the inside wall of the retention casing presents substantially axial ribs.

18. A turbojet according to claim 11, wherein said unbalance of said fan and said contact between said tip portions and said inside wall of said retention casing is caused by a displacement of said hub.

19. A turbojet according to claim 11, wherein said unbalance of said fan and said contact between said tip portions and said inside wall of said retention casing is caused by a breakage of one of said blades of said fan.

20. A blade for a turbojet comprising:
a pressure side face;
a suction side face defining a groove in a tip portion of said blade; and
a resin filling in said groove and configured to provide aerodynamic continuity for said suction side face,
wherein said groove has a depth configured to facilitate breaking of said tip portion of said blade.

* * * * *